United States Patent [19]

Kaneyuki

[11] Patent Number: 4,730,516
[45] Date of Patent: Mar. 15, 1988

[54] DRIVE APPARATUS FOR AUXILIARY EQUIPMENT RESPONSIVE TO A CHARGING GENERATOR SPEED REPRESENTING SIGNAL

[75] Inventor: Kazutoshi Kaneyuki, Himeji, Japan

[73] Assignee: Mitsubishi Denki Kabushiki Kaisha, Tokyo, Japan

[21] Appl. No.: 846,141

[22] Filed: Mar. 31, 1986

[30] Foreign Application Priority Data

Apr. 1, 1985 [JP] Japan .................................. 60-69508

[51] Int. Cl.4 ........................ F16H 3/74; F16H 15/50
[52] U.S. Cl. .................................... 74/752 D; 74/191; 74/796; 322/38
[58] Field of Search ................. 74/752 B, 752 D, 796, 74/190.5, 191; 320/61, 67, 72; 322/38; 474/70

[56] References Cited

U.S. PATENT DOCUMENTS

| | | | |
|---|---|---|---|
| 2,836,994 | 6/1958 | Weber | 74/796 |
| 3,108,496 | 10/1963 | Kashihara | 74/796 |
| 3,504,187 | 3/1970 | Laudel, Jr. | 322/38 X |
| 4,232,561 | 11/1980 | Kashihara et al. | 74/191 |
| 4,617,626 | 10/1986 | Morishita et al. | 320/61 X |

FOREIGN PATENT DOCUMENTS

| | | |
|---|---|---|
| 54-5165 | 1/1979 | Japan . |
| 58-86434 | 6/1983 | Japan . |
| 58-200838 | 11/1983 | Japan . |
| 231252 | 12/1984 | Japan ...................................... 74/796 |

Primary Examiner—Leslie Braun
Assistant Examiner—Dwight G. Diehl
Attorney, Agent, or Firm—Leydig, Voit & Mayer

[57] ABSTRACT

A drive apparatus for auxiliary equipment is disclosed which has a planetary cone reduction gear housed within a pulley which belt drives auxiliary equipment including a charging generator. An adjusting mechanism for adjusting the reduction ratio of the speed change gear is controlled by an electrical control circuit which is responsive to the rotational speed of the pulley. The voltage induced at the output terminal for one of the phases of a charging generator driven by the pulley is used as an electrical signal indicating the speed of the pulley.

3 Claims, 5 Drawing Figures

DRIVE APPARATUS FOR AUXILIARY EQUIPMENT RESPONSIVE TO A CHARGING GENERATOR SPEED REPRESENTING SIGNAL

BACKGROUND OF THE INVENTION

This invention relates to a drive apparatus for the auxiliary equipment of a motor, and more particularly but not exclusively to the case in which the motor is the engine of an automobile.

In an automobile, engine auxiliary equipment such as charging generators, water pumps, air conditioning compressors, and oil pumps for hydraulic servo steering is belt-driven by a drive pulley mounted on the end of the crankshaft of the engine. This auxiliary equipment is generally designed to be operated at low speeds, and if driven at the same speed as the engine when the engine is running at high speeds, the operation of the equipment would produce considerable power losses. Therefore, means are generally provided for adjusting the rotational speed of the drive pulley for the auxiliary equipment with respect to the rotational speed of the engine so that the auxiliary equipment can be operated at suitable speeds.

FIG. 1 shows one type of auxiliary equipment drive apparatus which has been proposed in the past. In this apparatus, a rotating input member in the form of a hollow input shaft 1 is directly connected to the crankshaft of an unillustrated engine. A rotating output member in the form of a pulley 2 is rotatably supported on the input shaft 1 and on a stationary plate 3. The pulley 2 comprises a peripheral casing 2a and an end plate 2b which is secured to the casing 2a by screws 2c. The pulley 2 drives a number of pieces of unillustrated auxiliary equipment by belts which are wound around the pulley casing 2a. The end plate 2b is rotatably supported by the input shaft 1 through a ball bearing 4, while the peripheral casing 2a is rotatably supported by the stationary plate 3 through another ball bearing 5. The stationary plate 3 is secured to a stationary portion of the engine by unillustrated bolts which pass through bolt holes 3a formed in the stationary plate 3. A roller bearing 6 is provided between the input shaft 1 and a flange portion of the stationary plate 3 which surrounds the input shaft 1.

Between the input shaft 1 and the peripheral casing 2a of the pulley 2 is an adjustable, stepless, frictional speed change mechanism in the form of a planetary cone reduction gear 7 which transmits drive force from the input shaft 1 to the pulley 2 at an adjustable speed. The planetary cone reduction gear 7 has a plurality of planetary cones 8 which are rotatably mounted by their stems on a cone support ring 9 which surrounds the input shaft 1 and can rotate with respect thereto. Each of the cones 8 has a first frictional transmission surface 8a which forms the top surface of the cone 8, a second frictional transmission surface 8b which forms the base of the cone 8, and a third frictional transmission surface 8c which forms the periphery of the stem of the cone 8. The axis of each cone 8 is sloped with respect to the axis of the input shaft 1 so that a line which is parallel to the axis of the input shaft 1 can be drawn from the vertex of the cone 8 to its base along its top surface. The first frictinal transmission surface 8a of each cone 8 frictionally engages with the inner surface of a speed change ring 10 which is concentrically disposed with respect to the input shaft 1. The speed change ring 10 has a plurality of pins 10a secured to its outer surface, and on each of these pins 10a are rotatably mounted two roller keys 10b and 10c. The outer roller keys 10b are disposed inside corresponding axially-extending grooves 2d formed in the inner surface of the peripheral casing 2a of the pulley 2. With this structure, the rotation of the speed change ring 10 is transmitted to the peripheral casing 2a of the pulley 2 by the outer roller keys 10b, causing the pulley 2 to rotate at the same speed as the speed change ring 10, but at the same time, the speed change ring 10 is able to freely move in the axial direction of the pulley 2. The second frictional transmission surface 8b of each cone 8 is in frictional engagement with the outer periphery of an input ring 11 which surrounds the input shaft 1. The input ring 11 is caused to rotate together with the input shaft 1 by a transmission mechanism 12 comprising a first race 12a and a plurality of balls 12b. The balls 12b are held between the undulating surface of the first race 12a and a similar undulating surface of a second race which is formed on the inner portion of the input ring 11. When the iput shaft 1 is rotated, the transmission mechanism 12 exerts a torque on the input ring 11 as well as a force in the axial direction which causes the outer end of the input ring 11 to contact with the second frictional transmission surface 8b of each of the planetary cones 8. The third frictional transmission surface 8c of each planetary cone 8 is in frictional engagement with the outer peripheral surface of a stationary guide ring 13 which is secured to the stationary plate 3. When the planetary cones 8 are caused to rotate about their axes by the rotation of the input ring 11, the frictional engagement between the guide ring 13 and the third frictional transmission surfaces 8c causes the planetary cones 8 to revolve about the axis of the input shaft 1. A roller bearing 14 is disposed between the guide ring 13 and the input shaft 1.

The reduction ratio of the reduction gear 7 can be adjusted by moving the speed change ring 10 in the axial direction of the input shaft 1, and this is accomplished by a reduction ratio adjustment mechanism in the form of an overcurrent electromagnetic brake 15 and a cylindrical cam 16. The overcurrent electromagnetic brake 15 has an electromagnetic coil 15a which is mounted on the stationary plate 3 and which uses the stationary plate 3 as a portion of a magnetic path, an electromagnetic pole 15b which is also secured to the stationary plate 3, and a cylindrical overcurrent cup 15c which surrounds the pole 15b and which is made of a material with good electrical conductivity. The cylindrical cam 16 is a tubular member having a flange 16a which is integral with the overcurrent cup 15c and a plurality of axially-extending cam surfaces 16b which confront the inner roller keys 10c mounted on the pins 10a of the speed change ring 10. The cylindrical cam 16 and the overcurrent cup 15c are rotatably supported by the pulley casing 2a through a ball bearing 17. A number of packing rings 18 are disposed between the input shaft 1, the pulley 2, and the stationary plate 3 so as to prevent lubricating oil from leaking from the inside of the pulley 2.

A pulse pickup 20 is mounted on the stationary plate 3 so as to confront one end of the pulley casing 2a across a small gap. The portion of the pulley casing 2a which it confronts has a plurality of slits 2e cut in it at regular intervals around its circumference. When the pulley casing 2a rotates, the pulse pickup 20 produces an electrical output signal in the form of an electrical pulse each time one of the slits 2e passes by it.

The mechanism for adjusting the reduction ratio of the planetary cone reduction gear 7 is controlled by a control circuit shown in the form of a block diagram in FIG. 2. Element number 21 is a waveform shaping circuit which receives the output signal from the pulse pickup 20 and which produces a waveform-shaped output signal. Element number 22 is a digital-to-analog converter which receives the output signal from the waveform shaping circuit 21, which is a periodic digital signal which is proportional to the rotational speed of the pulley 2, and converts it into an analog output signal. Element number 23 is a load detecting circuit which produces output signals indicative of the load conditions of the engine and of the various pieces of auxiliary equipment which are driven by the drive apparatus. Element number 24 is a calculating circuit which receives the output signals from the load detecting circuit 23, computes the optimal rotational speed of the pulley 2 based on the load conditions, and produces a corresponding output signal. Element number 25 is a comparator which compares the output signals from the digital-to-analog converter 22 and from the calculating circuit 24 and produces a corresponding output signal. Element number 26 is a current control circuit which duty controls the exciting current of the electromagnetic coil 15a of the overcurrent electromagnetic brake 15 based on the output signal from the comparator 25.

The operation of this conventional drive apparatus is as follows. When the input shaft 1 is rotated by the unillustrated engine, the input ring 11 is caused to rotate by the transmission mechanism 12, and the planetary cones 8 are caused to rotate about their axes. At the same time, due to the frictional engagement between the planetary cones 8 and the stationary guide ring 13, the planetary cones 8 revolve about the input shaft 1, performing planetary motion. The frictional engagement between the planetary cones 8 and the speed change ring 10 causes the speed change ring 10 to rotate about the center of the input shaft 1, and this rotation is transmitted to the pulley casing 2a by the outer roller keys 10b. The pulley 2 thus rotates at the same speed as the speed change ring 10, and the unillustrated auxiliary equipment is belt-driven by the pulley 2.

The reduction ratio of the reduction gear 7 can be set at a desired value by moving the speed change ring 10 in the axial direction of the input shaft 1, and this is done by controlling the damping force exerted by the overcurrent electromagnetic brake 15. When the speed change ring 10 rotates, rotational force is transmitted to the cam surfaces 16b of the cylindrical cam 16 by the inner roller keys 10c, and this causes the cylindrical cam 16 and the overcurrent cap 15c to rotate as a single body at the same speed as the speed change ring 10. When the electromagnetic coil 15a of the overcurrent electromagnetic brake 15 is excited, a damping force is exerted on the overcurrent cup 15c, and this causes the cam surfaces 16b to press against the inner roller keys 10c, and a longitudinally-directed cam force is exerted on the speed change ring 10 through the inner roller keys 10c. This force acts to move the speed change ring 10 in the axial direction of the input shaft 1. At the same time, in a planetary cone reduction gear of this type, the planetary motion of the planetary cones 8 produces a longitudinally-directed biasing force on the speed change ring 10. In this conventional mechanism, the cam surfaces 16b are shaped such that the longitudinally-directed force which is exerted on the speed change ring 10 by the overcurrent electromagnetic brake 15 through the cam surfaces 16b is opposite in direction to the biasing force on the speed change ring 10 produced by the planetary motion. Therefore, when a damping force is applied to the overcurrent cup 15c, the speed change ring 10 will move to the point on the top surfaces of the planetary cones 8 where the longitudinally-directed force exerted on it by the cam surfaces 16b is balanced by the biasing force. By adjusting the damping force exerted on the overcurrent cup 15c, the speed change ring 10 can be moved to any desired position along the top surfaces of the planetary cones 8. The damping force produced by the overcurrent electromagnetic brake 15 is automatically controlled by the control circuit illustrated in FIG. 2, which automatically adjusts the exciting current of the electromagnetic coil 15a based on operating condition..

Although the operation of this conventional drive apparatus is quite satisfactory, it has the problem that it requires a pulse pickup 20 to detect the rotational speed of the pulley 2, and this increases the weight and the cost of the apparatus. Furthermore, the requirement that slits 2e be provided in the pulley casing 2a increases manufacturing costs. In addition, there is the disadvantage that the pulley casing 2a must be made of a magnetic material, limiting the range of materials which can be employed.

SUMMARY OF THE INVENTION

It is an object of the present invention to overcome the problems described above and to provide an auxiliary equipment drive apparatus which does not require a pulse pickup, which does not require the provision of slits in a pulley casing, and which does not require the pulley casing to be made of a magnetic material.

The present invention is an auxiliary equipment drive apparatus having a rotating input member, a rotating output member, an adjustable speed change mechanism which drivingly connects the input member to the output member, a mechanism for adjusting the reduction ratio of the speed change mechanism, and a control mechanism for controlling the reduction ratio adjusting mechanism in accordance with load conditions. The control mechanism is electrically connected to the stator winding of one of the phases of a charging generator which is driven by the drive apparatus. The voltage induced in this stator winding serves as an electrical input signal for the control mechanism, indicating the rotational speed of the pulley. Accordingly, it is not necessary to provide a pulse pickup in order to detect the rotational speed of the pulley, it is not necessary to form slits in the pulley, and it is not necessary for the pulley to be made of a magnetic material.

BRIEF DESCRIPTION OF THE DRAWINGS

In the drawings, the same reference numerals indicate the same or corresponding parts.

DESCRIPTION OF THE PREFERRED EMBODIMENT

Figure 1:
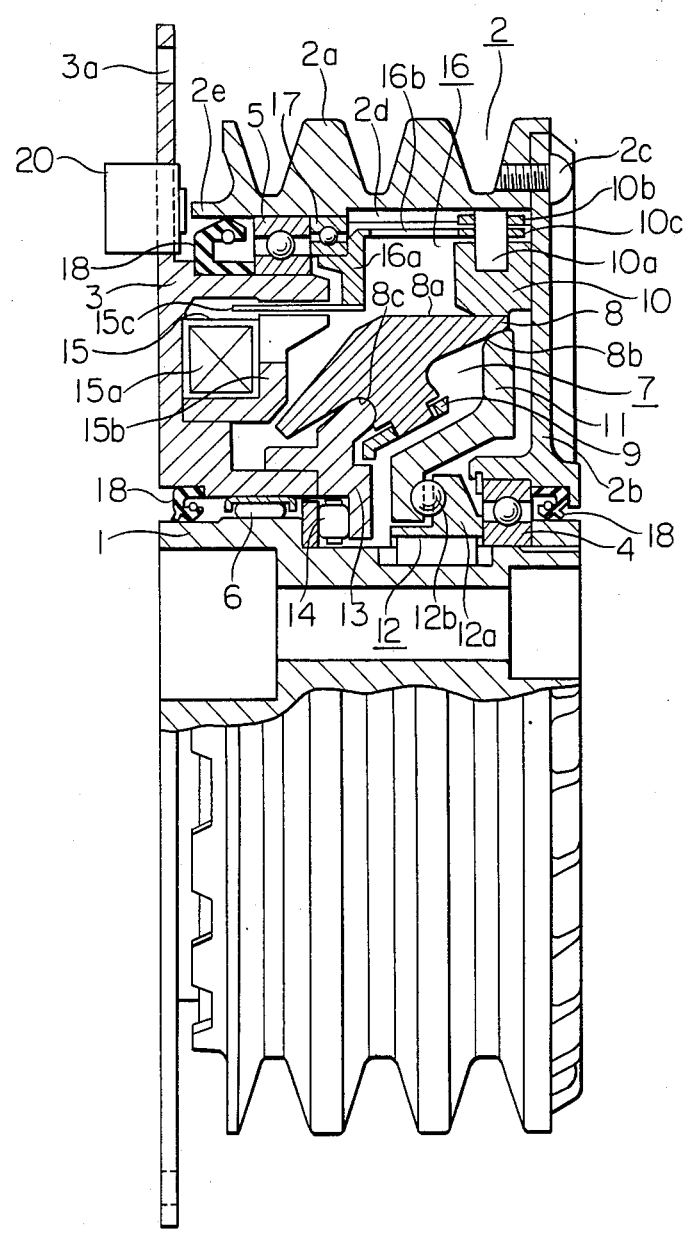
FIG. 1 is a partially cross-sectional side view of a conventional auxiliary equipment drive apparatus.
Figure 3:
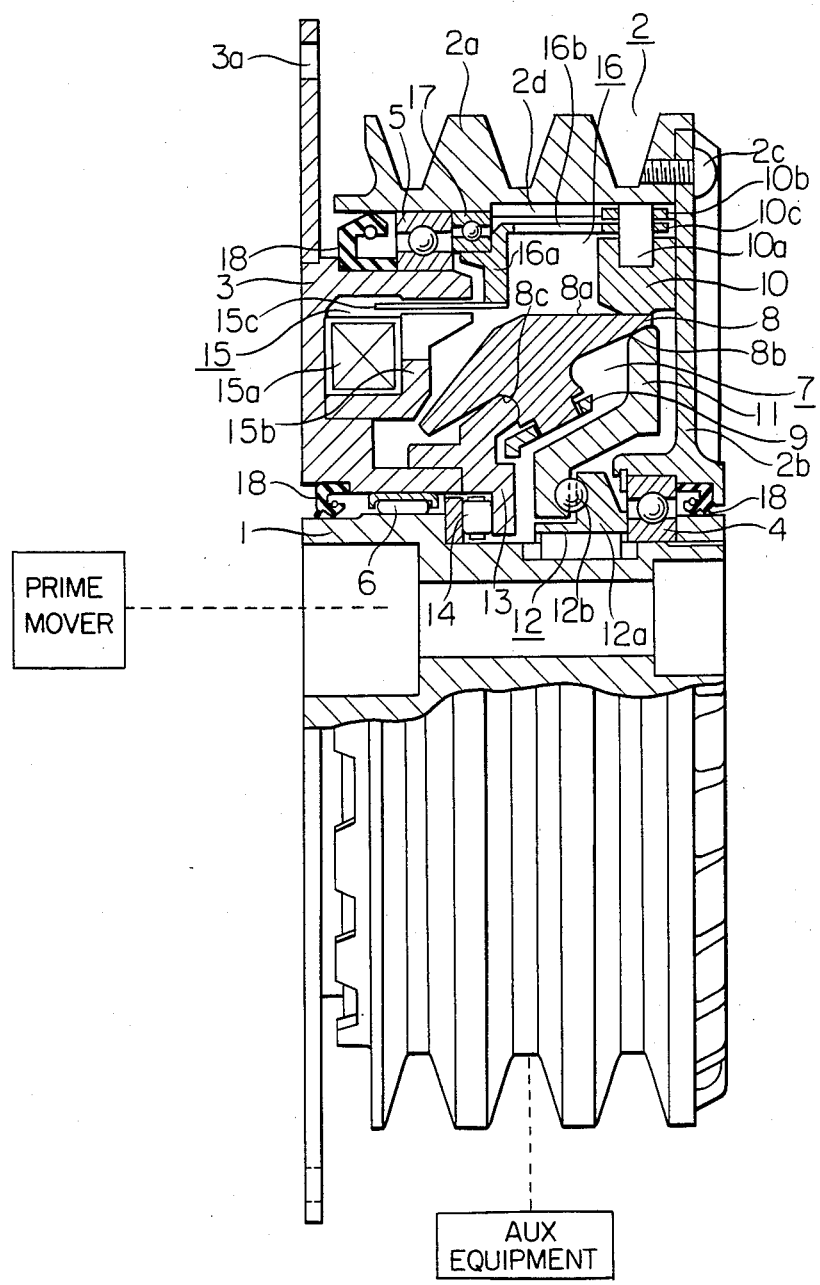
FIG. 3 is a partially cross-sectional side view of an embodiment of an auxiliary equipment drive apparatus according to the present invention.

Hereinbelow, one embodiment of an auxiliary equipment drive apparatus according to the present invention will be described will referring to FIGS. 3 through 5 of the accompanying drawings. FIG. 3 shows the mechanical portions of this embodiment. Except for the absence of a pulse pickup 20 and slits 2e in a pulley casing 2a, the mechanical portions of this embodiment are identical to the mechanical portions of the conventional apparatus illustrated in FIG. 1, and accordingly their explanation will be omitted.

Figure 2:
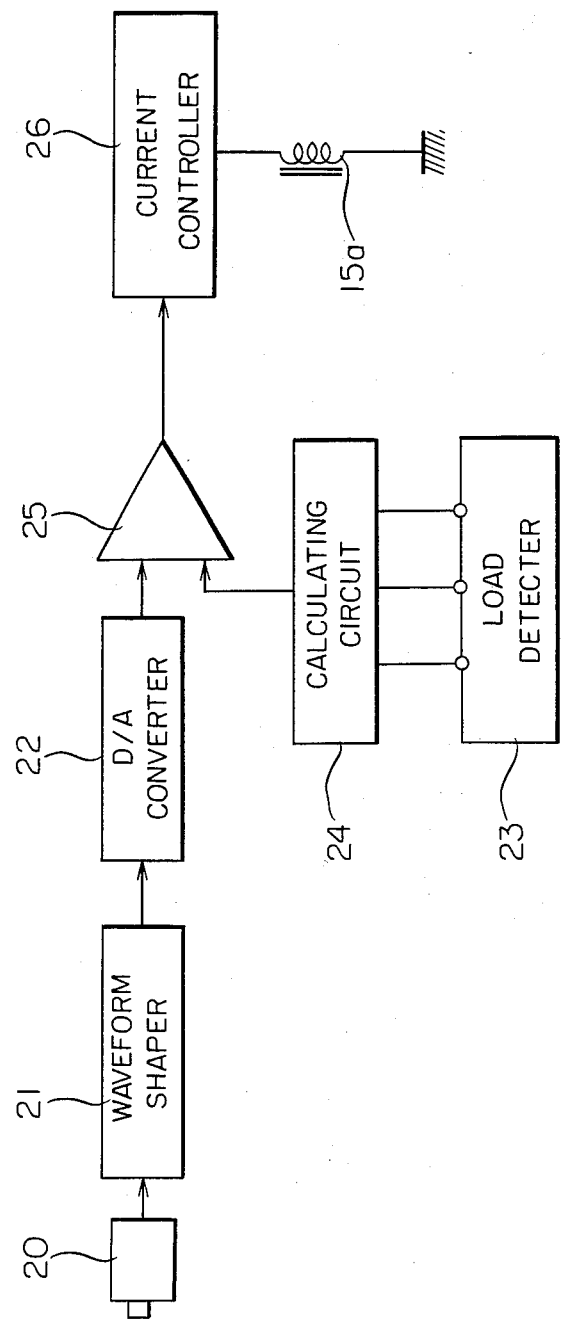
FIG. 2 is a block diagram of a control circuit for the conventional apparatus of FIG. 1.
Figure 4:
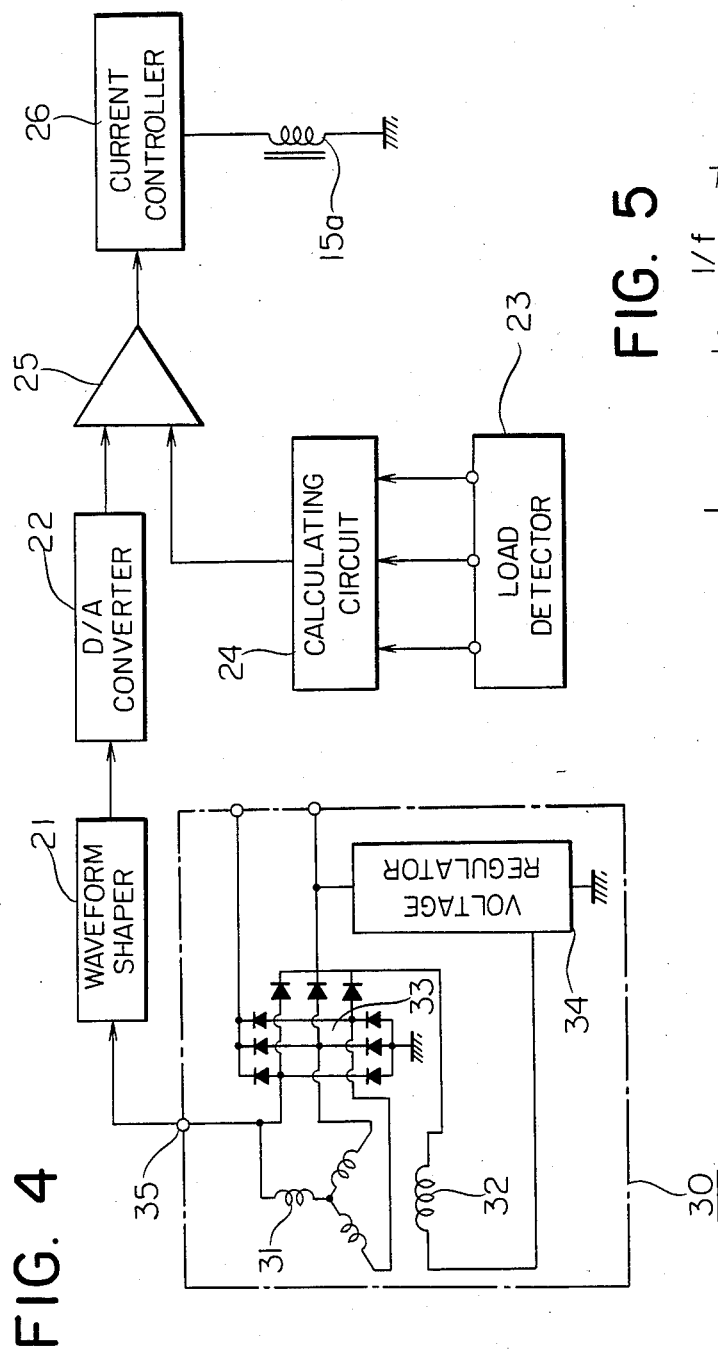
FIG. 4 is a block diagram of a control circuit for the embodiment illustrated in FIG. 3.
Figure 5:
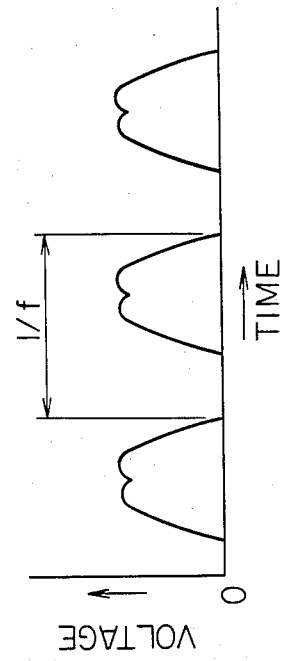
FIG. 5 is a graph illustrating the waveform of an output signal produced by the charging generator of FIG. 4.

FIG. 4 illustrates a control circuit for controlling the mechanism for adjusting the reduction ratio of the reduction gear 7 shown in FIG. 3. This control circuit comprises elements 21 through 26, and except for the absence of a pulse pickup 20, this control circuit is identical to the conventional one illustrated in FIG. 2. In this embodiment, instead of being connected to a pulse pickup 20, a waveform shaping circuit 21 is electrically connected to an output terminal 35 for one phase of a 3-phase charging generator 30 which is belt-driven by the pulley 2 of the drive apparatus. The charging generator 30 has stator windings 31 wound in three phases, field coils 32, a 3-phase full-wave rectifier 33 which converts the output of the stator windings 31 into direct current, and a constant voltage regulator 34 which maintains the output voltage of the charging generator 30 constant. Output terminal 35 is electrically connected to the stator winding 31 for one phase of the charging generator 30. This output terminal 35 is electrically connected to the waveform shaping circuit 21, and the voltage induced at the output terminal 35 during operation of the charging generator 30 serves as an electrical output signal indicating the rotational speed of the pulley 2.

When the input shaft 1 is rotated by the unillustrated engine, rotation is transmitted to the pulley casing 2a in the same manner as in the conventional apparatus, and the charging generator 30 and other auxiliary equipment are belt-driven by the pulley 2. The charging generator 30 generates electricity, and a voltage having the waveform illustrated in FIG. 5 is induced at the output terminal 35. This voltage is applied to the waveform shaping circuit 21 as an electrical input signal. If the rotational speed of the charging generator is N rpm, and the number of poles of the charging generator 30 is P, then the frequency f of this output signal in hertz is NP/120. Because the number of poles P is constant, the frequency f of the output signal from the output terminal 35 is directly proportional to the rotational speed N of the charging generator 30, and since the pulley ratio between the pulley 2 and the charging generator 30 is constant, the frequency f is directly proportional to the rotational speed of the pulley 2. This output signal can therefore be used instead of an output signal from a pulse detector 20 to indicate the rotational speed of the pulley 2, and the exciting current of the electromagnetic coil 15a is controlled by the control circuit based on the frequency of the output signal from the output terminal 35 in the same manner as in the conventional control circuit shown in FIG. 2.

Thus, in the present invention, the rotational speed of the pulley 2 is detected without the need for a pulse pickup 20 or for the provision of slits 2e in the pulley casing 2a. Therefore, it is lighter and less expensive than the conventional apparatus illustrated in FIG. 1. For the same reason, the pulley casing 2a does not need to be made of a magnetic material, greatly increasing the range of materials which can be used.

In the above-described embodiment, a planetary cone reduction gear is employed as an adjustable, stepless speed change mechanism, and the mechanism for adjusting the reduction ratio of the speed change mechanism is an overcurrent electromagnetic brake. However, it is possible to employ other types of speed change mechanisms and reduction ratio adjusting mechanisms in the present invention and still achieve the same effects.

What is claimed is:

1. A drive apparatus driving auxiliary equipment of a prime mover, said auxiliary equipment including a charging generator having a stator winding for one phase, said stator winding having an induced voltage upon rotation of said generator, said drive apparatus comprising:

a rotating input member adapted to be connected to be driven by the prime mover;

a rotating output member connected to said auxiliary equipment so as to drive said auxiliary equipment including said generator;

an adjustable speed change mechanism connected between said rotating input member and said rotating output member so as to transmit rotational force from said input member to said output member; and adjusting means for adjusting the reduction ratio of said speed change mechanisms and control means for controlling said adjusting means in response to an electrical input signal indicating the rotational speed of said rotating output member, the electrical input signal being the voltage induced in said stator winding for one phase of said charging generator.

2. A drive apparatus as claimed in claim 1, wherein:

said rotating output member includes a pulley surrounding said rotating input member, said speed change mechanism, and said adjusting means; and said adjustable speed change mechanism includes a planetary cone reduction gear housed inside said pulley.

3. A drive apparatus as claimed in claim 2, wherein said planetary cone reduction gear comprises:

a cone support ring mounted on said rotating input member and rotatable with respect thereto;

a plurality of planetary cones having stems rotatably mounted on said cone support ring, each having a first frictional transmission surface forming its top surface, a second frictional transmission surface forming its base, and a third frictional transmission surface forming the periphery of said stem, the axis of each said cone being angled wtih respect to the axis of said rotating input member such that a line which is parallel to the axis of said rotating input member can be drawn from the vertex to the base of said cone along its top surface;

a rotating input ring mounted on said rotating input member for rotation thereby and having an outer periphery in frictional engagement with said second frictional transmission surfaces such that the rotation of said input ring causes said said planetary cones to rotate on the axes thrust;

a stationary guide ring surrounding said rotating input member for frictionally engaging with said third frictional transmission surfaces of said planetary cones; and a speed change ring supported by said pulley so as to rotate together with said pulley and to move in an axial direction with respect to said pulley, said speed change ring having an inner surface in frictional engagement with said first frictional transmission surfaces of said planetary cones.

* * * * *